(12) United States Patent
Eller et al.

(10) Patent No.: US 11,484,967 B2
(45) Date of Patent: Nov. 1, 2022

(54) TOOLING FOR FRICTION STIR PROCESSING

(71) Applicant: Lockheed Martin Corporation, Bethesda, MD (US)

(72) Inventors: Michael R. Eller, New Orleans, LA (US); Kevin John Schuengel, Bay St. Louis, MS (US); Mark Steven Gambino, Madisonville, LA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 129 days.

(21) Appl. No.: 16/795,457

(22) Filed: Feb. 19, 2020

(65) Prior Publication Data
US 2021/0252632 A1    Aug. 19, 2021

(51) Int. Cl.
*B23K 20/00* (2006.01)
*B23K 20/12* (2006.01)

(52) U.S. Cl.
CPC ........ *B23K 20/1255* (2013.01); *B23K 20/125* (2013.01)

(58) Field of Classification Search
CPC ..... H01F 1/0576; H01F 1/0574; B21C 25/02; B21C 23/085; B21C 25/04; B21C 23/002; B21C 23/005; B23K 11/0013; B23K 13/00; B23K 20/1215; B23K 20/1255
See application file for complete search history.

(56) References Cited

U.S. PATENT DOCUMENTS

| | | | | |
|---|---|---|---|---|
| 4,812,370 | A * | 3/1989 | Okada | C23C 30/005 428/552 |
| 6,302,315 | B1 * | 10/2001 | Thompson | B23K 20/123 228/114.5 |
| 2006/0102689 | A1 * | 5/2006 | Trapp | B23K 20/126 228/2.1 |
| 2018/0311713 | A1 * | 11/2018 | Joshi | B21C 23/218 |

* cited by examiner

*Primary Examiner* — Erin B Saad
(74) *Attorney, Agent, or Firm* — BakerHostetler

(57) ABSTRACT

A friction stir processing system can include a rotatable die assembly. The rotatable die assembly can include a die body and a plurality of die segments. The die body includes a die base and a die stem. The die stem extends axially from the die base, the die stem defines an extrusion cavity, and the die body is formed from a first material. The plurality of die stems are coupled to the die stem. The plurality of die segments are disposed around the extrusion cavity to collectively form a die surface opposite to the die base. The plurality of die segments are formed from a different material than the die body.

20 Claims, 9 Drawing Sheets

TOOLING FOR FRICTION STIR PROCESSING

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND

Field

The present description relates in general to friction stir processing, and in particular to, for example, without limitation, tooling for friction stir processing.

Description of the Related Art

The description provided in the background section should not be assumed to be prior art merely because it is mentioned in or associated with the background section. The background section may include information that describes one or more aspects of the subject technology.

Friction stir processing (FSP) is a solid-state process in which a rotating pin tool modifies the microstructure of a workpiece to process the workpiece without melting the feedstock. However, various challenges can arise when attempting to process high-temperature metals (titanium, Inconel, etc.) or large diameter workpieces using friction stir processing.

It would be advantageous to have friction stir processing tooling that can allow for the processing of high-temperature metals and/or large diameter workpieces compared to conventional tooling.

SUMMARY

The subject technology is illustrated, for example, according to various aspects described below.

According to some embodiments, a friction stir processing system can include a rotatable die assembly including: a die body defining a die base and a die stem, wherein the die stem extends axially from the die base, the die stem defines an extrusion cavity, and the die body is formed from a first material; and a plurality of die segments coupled to the die stem, wherein the plurality of die segments are disposed around the extrusion cavity to collectively form a die surface opposite to the die base, the plurality of die segments are formed from a second material, and the second material is different than the first material.

Optionally, each of the plurality of die segments can include a die segment boss configured to engage with the die stem.

In some embodiments, the die surface formed by the plurality of die segments defines a smooth contoured profile. Optionally, the die surface formed by the plurality of die segments defines a sloping profile. Similarly, the die surface formed by the plurality of die segments defines a concave profile, and the concave profile is directed toward the extrusion cavity.

In some embodiments, the extrusion cavity tapers from a first diameter to a second diameter.

The first material can include a nickel-cobalt alloy or a tungsten alloy and the second material can include tungsten.

Optionally, the friction stir processing system can include a mandrel assembly including an inner mandrel axially aligned with the extrusion cavity; and an outer mandrel disposed around the inner mandrel, wherein the inner mandrel and the outer mandrel define a container volume.

In some embodiments, the inner mandrel tapers from a first diameter to a second diameter.

In some embodiments, the outer mandrel defines a cooling channel around the container volume. Optionally, the outer mandrel defines a heat exchanger around the container volume.

The mandrel assembly can be formed from a nickel-cobalt alloy or a tungsten alloy. Optionally, the mandrel assembly is coated with tungsten.

According to some embodiments a friction stir processing system can include a rotatable die assembly including: a die body defining a die base and a die stem, wherein the die stem extends axially from the die base, the die stem defines an extrusion cavity, and the die body is formed from a first material; and a die surface portion coupled to the die stem, wherein the die surface portion defines a spiral scroll feature, the die surface portion is disposed around the extrusion cavity, the die surface portion is formed from a second material, and the second material is different than the first material.

In some embodiments, the spiral scroll feature is ground into the die surface portion.

According to some embodiments, a method can include rotating a die surface of a die assembly against a billet, wherein the die assembly comprises a plurality of die segments coupled to a die stem, the plurality of die segments collectively form the die surface, the die stem is formed from a first material, the plurality of die segments are formed from a second material, and the second material is different than the first material; and plasticizing the billet into a product.

In some embodiments, the method includes advancing the billet toward the die surface via a mandrel. Optionally, the product is an extruded tube. Further, the method can include depositing the billet on to a substrate.

In the following description, specific embodiments are described to shown by way of illustration how the invention may be practiced. It is to be understood that other embodiments may be utilized and changes may be made without departing from the scope of the present invention.

DETAILED DESCRIPTION

Figure 1:
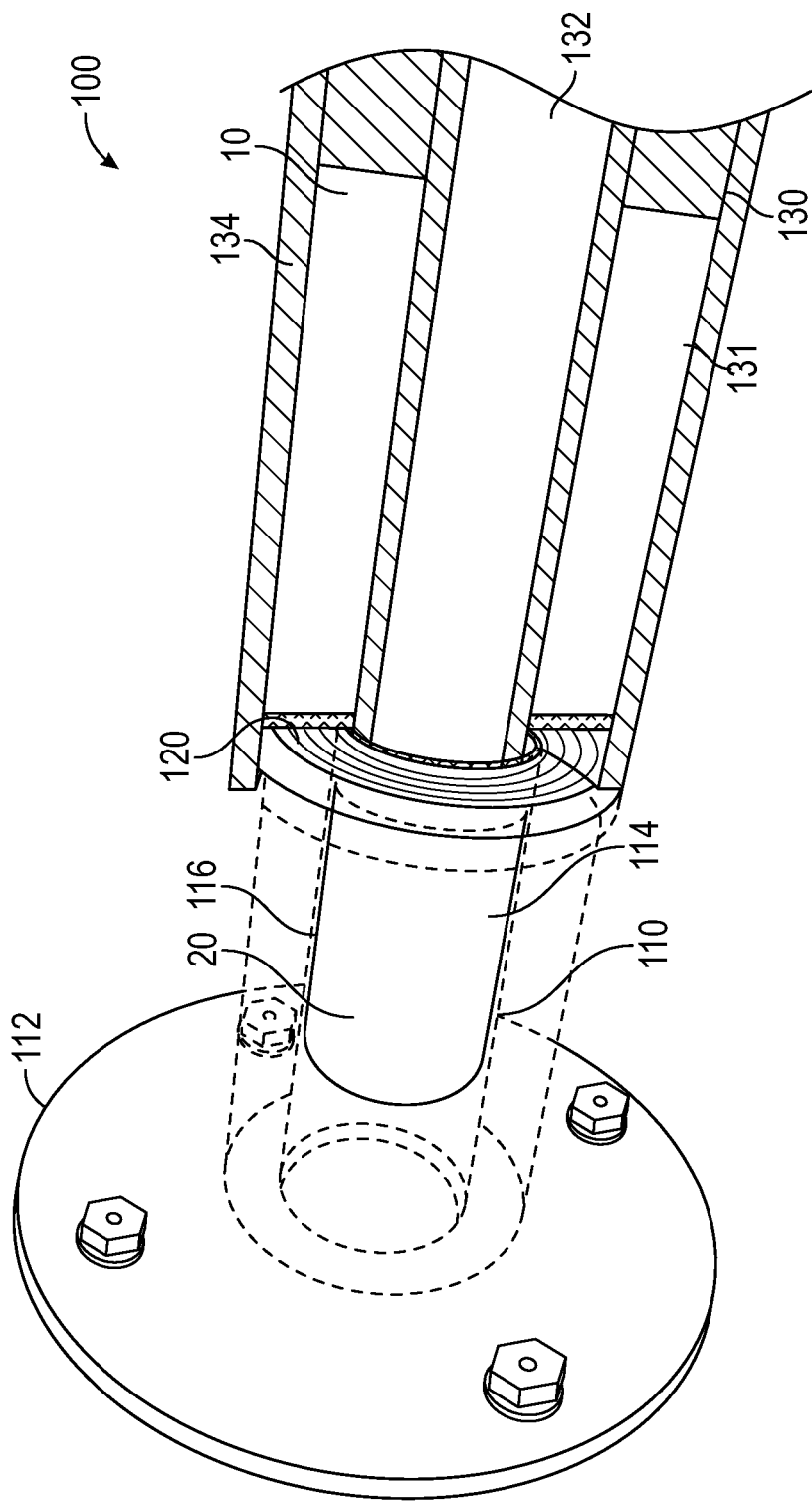
FIG. 1 illustrates a perspective view of a friction stir processing system, according to some embodiments of the present disclosure.

FIG. 1 illustrates a perspective view of a friction stir processing system 100, according to some embodiments of the present disclosure. In the depicted example, the friction stir processing system 100 can form extruded tubing 20 from billet 10 by utilizing friction stir processing (FSP). As described herein, friction stir processing (FSP) is a solid-state process in which a non-consumable rotating pin tool or die assembly 110 traverses along the surface of a workpiece or billet 10 to modify the microstructure of the billet 10. As can be appreciated, FSP is an adaptation of friction stir welding (FSW) in which a non-consumable rotating pin tool is forcibly inserted and pushed laterally through the workpiece with the objective of joining workpieces together without melting.

In the depicted example, the friction stir processing system 100 utilizes a type of friction stir processing referred to as friction stir extrusion (FSE) whereby the material or billet 10 is stirred by a non-consumable pin tool or die assembly 110 while an extrusion force is applied by a mandrel assembly 130 generally along the same axis as the rotating die assembly 110. FSE is typically applied to the entire material of billet 10 "in bulk" where all the material being forced past the FSE tool or die assembly 110 can be transformed to have a recrystallized fine grain microstructure as described herein.

In some embodiments, the mandrel assembly 130 stores and advances the billet 10 toward the rotating die assembly 110 during the FSE process. As described herein, the billet 10 can include low-temperature alloys such as aluminum, magnesium, etc. and/or high-temperature alloys Inconel, titanium, titanium aluminide, etc. As illustrated, the billet 10 can be stored in a container volume 131 defined between an inner mandrel 132 and an outer mandrel 134. The container volume 131 can be defined between the outer surface of the inner mandrel 132 and the inner surface of the outer mandrel 134. The inner mandrel 132 and/or the outer mandrel 134 can have a generally cylindrical shape. During operation, the mandrel assembly 130 can advance the billet 10 toward the rotating die assembly 110 to facilitate friction stir extrusion of the billet 10.

In the depicted example, the rotating die assembly 110 can be rotated either directly or indirectly by a motor or pulley assembly. Optionally, the die base 112 can be coupled to a motor or other actuator to rotate the entire die assembly 110. The die stem 114 can extend from the die base 112. The die stem 114 can have a generally cylindrical shape and defines an extrusion cavity 116. In some embodiments, portions of the die assembly 110 such as the die base 112 and the die stem 114 can be formed from superalloys (nickel-cobalt alloy, such as MP159 or a tungsten alloy), maraging steels, and/or tool steels.

During the FSE process, the billet 10 is advanced or otherwise presented to the rotating die assembly 110, imparting frictional heating to the billet 10 at the die surface 120. As can be appreciated, the frictional heating of the billet 10 and the axial force imparted by the mandrel assembly 130 can result in plastic deformation of the billet 10. Further, as a result of the extreme conditions of the FSE process, severe deformation and wear can occur at the die surface 120. In some embodiments, portions of the die assembly 110, including portions of the die base 112, the die stem 114, and/or the die surface 120 can be formed from tungsten and/or tungsten alloys to withstand the conditions of the FSE process.

As the billet 10 is frictionally heated, the billet 10 is extruded through the die assembly 110 to form the extruded tube 20. In the depicted example, the deformed billet 10 is extruded through the extrusion cavity 116 by the relative motion of the mandrel assembly 130 and the die assembly 110. For example, as the mandrel assembly 130 is advanced relative to the rotating die assembly 110, the billet 10 is forced between the outer wall of the inner mandrel 132 and the inner wall of the extrusion cavity 116, forming the extruded tube 20. In some embodiments, the inner mandrel 132 is axially aligned with the extrusion cavity 116. Optionally, the outer mandrel 134 can be axially aligned with the die stem 114, allowing the outer mandrel 134 to slide over the die stem 114 during the FSE process. In some embodiments, the mandrel assembly 130 can include a cooling coil to reject heat from the FSE process.

As can be appreciated, the stirring action of the die assembly 110 produces frictional heating and severe plastic deformation of the extruded tube 20, resulting in a fine dynamically recrystallized microstructure. Advantageously, the resultant fine grain microstructure exhibits metallurgical properties that are superior to other thermomechanical processing methods. Further, most or all of the precipitates are dissolved back into the base metal, resulting in extruded tube 20 having very fine equiaxed grains and much cleaner grain boundaries with fewer and smaller precipitates. The grains are also equiaxed in the direction of extrusion, whereby any cross-section of the extruded tube 20 will show a homogenous grain size. Fine grain microstructures enables higher ductility (formability), higher strength (via Hall-Petch equation), and higher corrosion resistance (smaller grain boundaries and dispersed particles).

As can be appreciated, the extruded tube 20 can still be heat treated after extruding, such as by aging to improve mechanical properties like tensile strength, as well as improve corrosion resistance. Friction-extruded products also exhibit better mechanical properties, and therefore have a much longer service life, as compared to conventionally extruded products.

For friction stir processing of certain high-temperature metals such as titanium alloys, Inconel alloys, etc., the tooling of the system must be able to withstand processing temperatures over 2,000° F. In some applications, the portion of the die stem 114 forming the die surface 120 can be formed from tungsten or tungsten alloy tooling. Conventionally, tungsten tooling has been used in sizes up to 2 inches in diameter for friction stir welding of titanium, Inconel and other high-temperature materials. As can be appreciated, while tungsten tooling may be produced in larger diameters, tungsten rods may become more brittle at larger diameters and might not be fully dense (i.e. less than 100% density). In some applications, smaller diameter rods can be rotary swaged to add work into the material thereby increasing its densification, strength, and ductility. However, larger diameter tungsten tooling may not be similarly increased in densification, strength, and ductility. Therefore, due to the limitations of producing larger tungsten tooling, single-piece conventional tungsten tooling may not be suitable for larger diameter materials, such as for friction stir extrusion of larger diameter tubing.

As described herein, it is advantageous to provide tooling that can scale to allow for friction stir processing of larger diameter materials, such as friction stir extrusion of larger diameter tubing and/or high-temperature materials such as titanium and/or Inconel. Advantageously, friction stir extrusion of large diameter tubing can be utilized for missile bodies and/or hypersonic structures. Further, it is advantageous to provide tooling to resist deformation and wear at high temperatures and forces.

Figure 2:
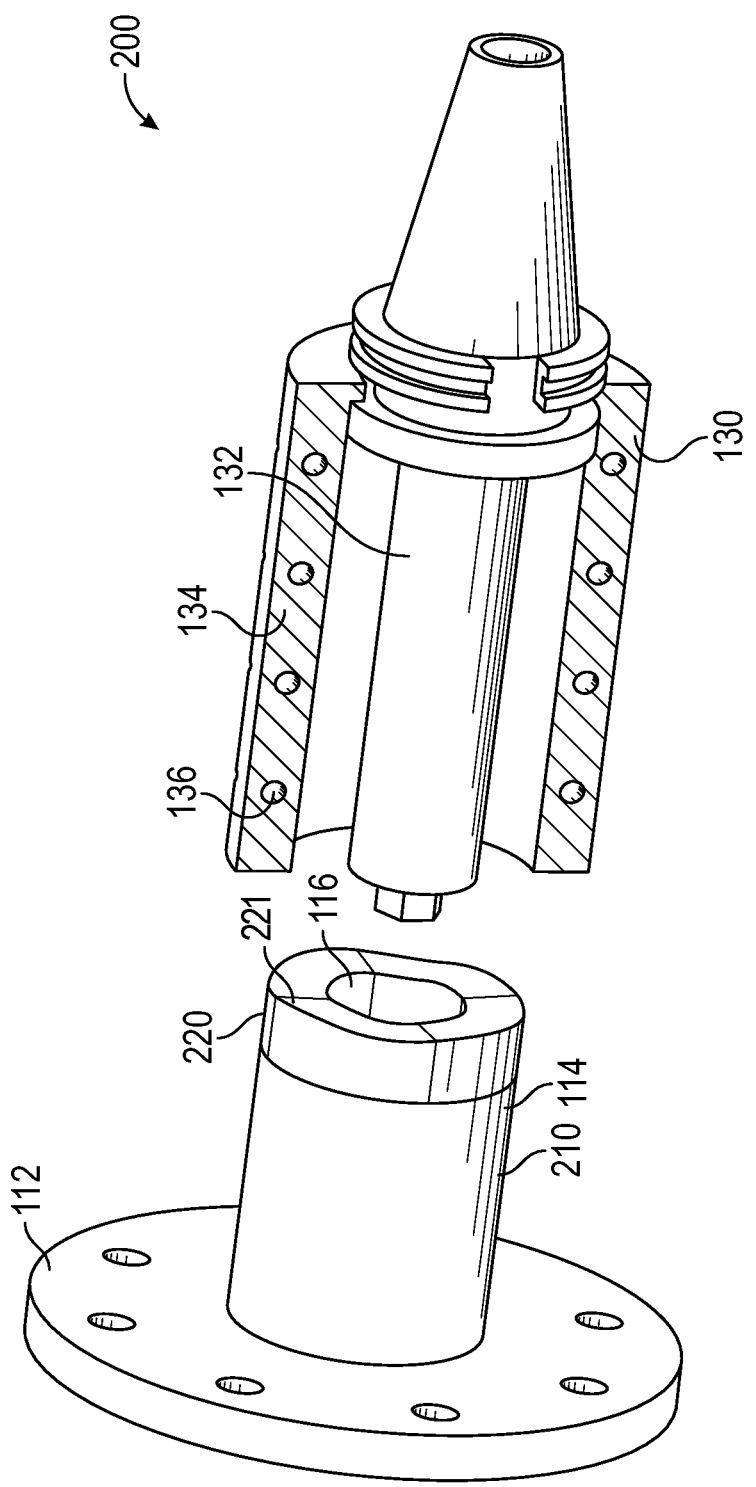
FIG. 2 illustrates a perspective view of a friction stir processing system, according to some embodiments of the present disclosure.
Figure 3:
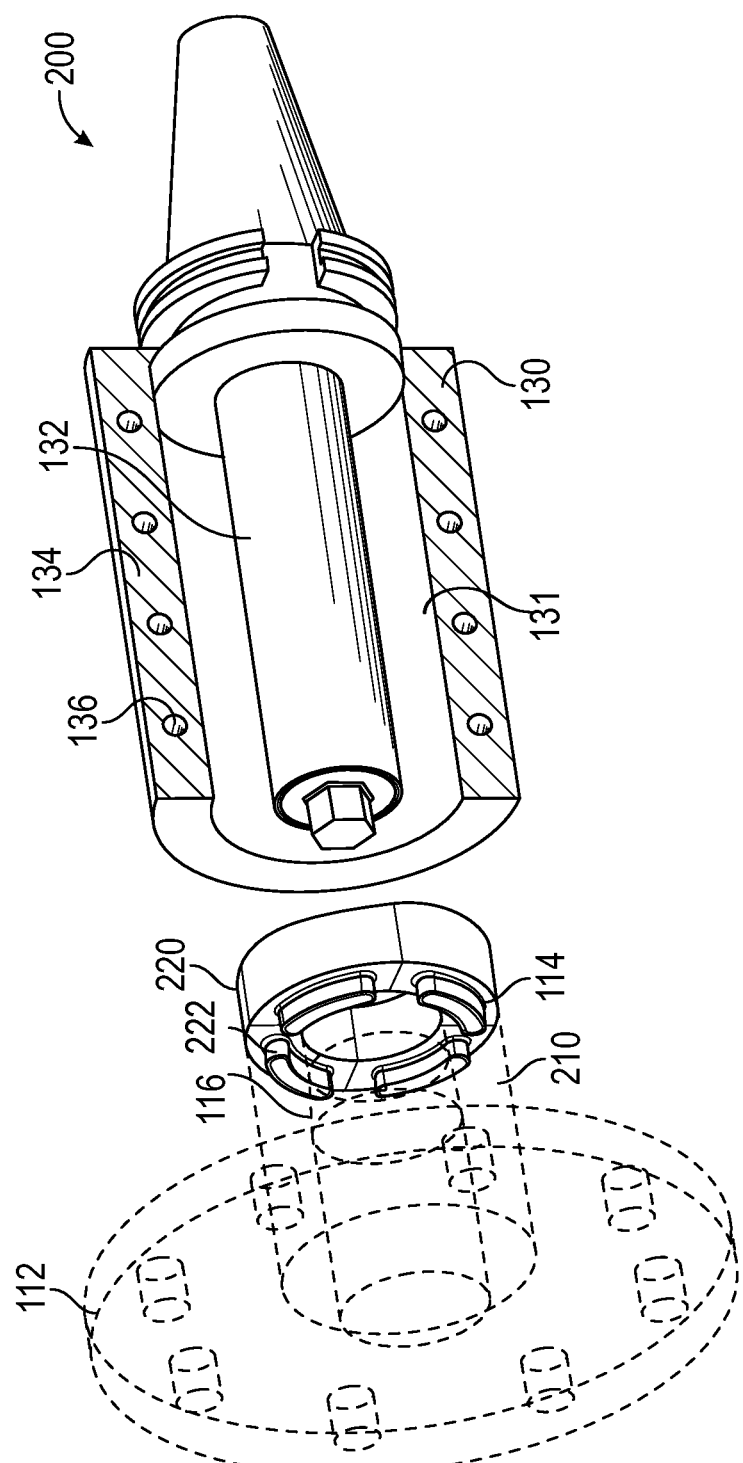
FIG. 3 illustrates a reverse perspective view of the friction stir processing system of FIG. 2, according to some embodiments of the present disclosure.

FIG. 2 illustrates a perspective view of a friction stir processing system 200, according to some embodiments of the present disclosure. FIG. 3 illustrates a reverse perspective view of the friction stir processing system 200 of FIG. 2, according to some embodiments of the present disclosure. With reference to FIGS. 2 and 3, the friction stir processing system 200 utilizes multi-piece die segments 221 to form the die surface 220, facilitating friction stir processing of larger diameter materials and/or high-temperature materials such as titanium and/or Inconel with multiple smaller die segments 221.

In the depicted example, two or more die segments 221 form the die surface 220 that interfaces with the billet 10. In some embodiments, the friction stir processing system 200 can include two, three, four, six, or any suitable number of die segments 221 to form the die surface 220. Each die segment 221 can form a portion of the die surface 220. Each die segment 221 can be equally sized or differently sized.

Optionally, the die segments 221 can be disposed around the extrusion cavity 116 to collectively define the die surface 220 around the extrusion cavity 116. In some embodiments, each die segment 221 can form an angular portion of the die surface 220.

In the depicted example, each of the die segments 221 can be coupled to the die stem 114. Optionally, each of the die segments 221 can include a boss 222 extending in a direction opposite to the die surface 220. The boss 222 can be configured to press fit into a mating receptacle of the die stem 114.

In the depicted example, the die segments 221 can be formed from tungsten to withstand high temperatures. Optionally, the die stem 114 can be made from a lower cost superalloy such as MP159 or a tungsten alloy such as tungsten carbide. While the die stem 114 can handle elevated temperatures during the frictional stir extrusion process, the material of the die stem 114 may not withstand the extreme temperatures at the interface of the billet 10 and the die surface 220. Advantageously, by mating the die segments 221 with the die stem 114, the friction stir processing system 200 can avoid the cost of forming the entire stem 114 from tungsten.

In some applications, the press fit between the die segments 221 and the die stem 114 can account for the difference in coefficient of thermal expansion between the die segments 221 and the die stem 114. As can be appreciated, since the die segments 221 experience the highest temperature at the die surface 220, the portion of the die segments 221 coupled to the die stem 114 may have a reduced temperature gradient.

Advantageously, the use of multi-piece die segments 221 allows for friction stir processing of larger workpieces, while using desired materials such as tungsten that can withstand the higher temperatures required for friction stir processing of high temperature metals such as titanium, Inconel, etc. Further, the die segments 221 can be individually refurbished or replaced if needed. Advantageously, repairing or replacing individual die segments 221 can be less expensive than replacing or repairing a single or monolithic die surface.

In some embodiments, the mandrel assembly 130 can include an cooling jacket to cool the billet 10 during frictional stir processing. In the depicted example, the outer mandrel 134 can include one or more cooling channels 136 formed circumferentially around the container volume 131 to cool the billet 10. In some embodiments, the cooling channels 136 allow for cooling flow to pass therethrough, removing heat from the billet 10. In some applications, a water/glycol mixture can flow through the cooling channels 136 to transfer heat from the mandrel assembly 130.

In some embodiments, the mandrel assembly 130 and/or portions of the mandrel assembly 130 including the inner mandrel 132 and the outer mandrel 134 can be formed from MP 159 and/or tungsten carbide. Portions of the mandrel assembly 130 can be coated with tungsten or any other refractory alloy. Tungsten can be applied to portions of the mandrel assembly 130 by sputtering, chemical vapor deposition (CVD), physical vapor deposition (PVD), thermal spray, cold spray, or other additive manufacturing technique.

Figure 4:
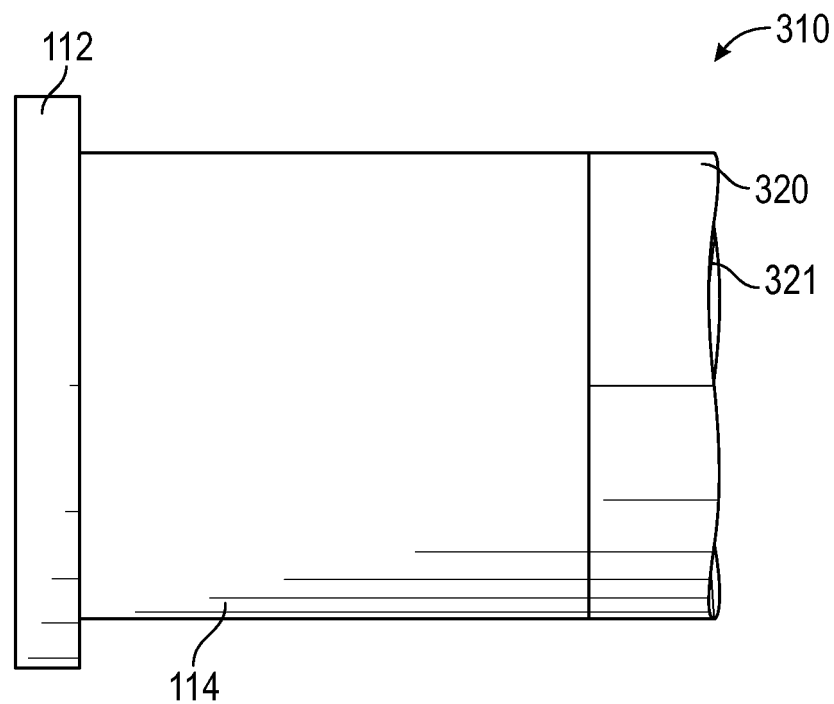
FIG. 4 illustrates an elevation view of a mandrel assembly, according to some embodiments of the present disclosure.
Figure 5:
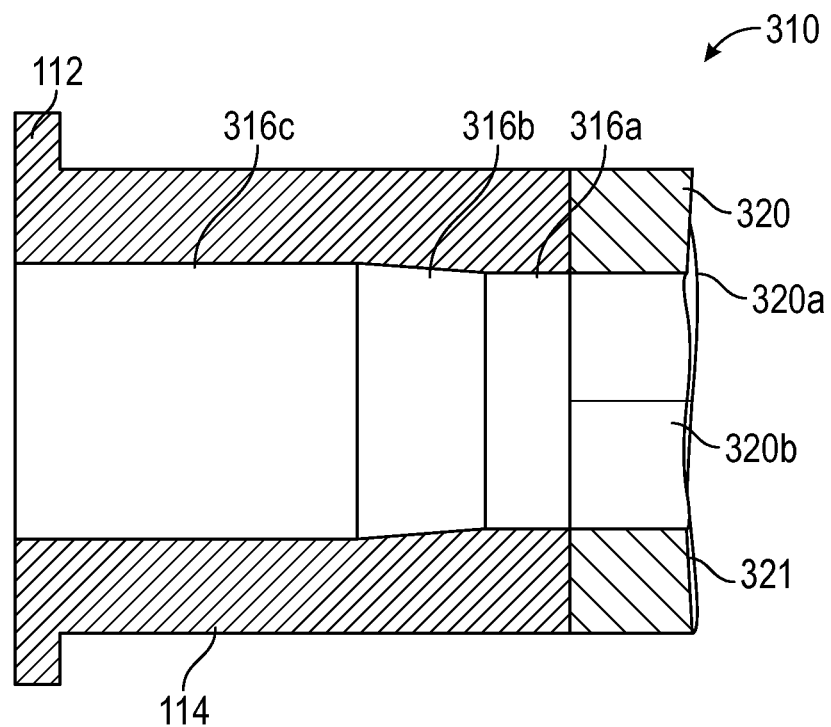
FIG. 5 is a cross-sectional view of the mandrel assembly of FIG. 4, according to some embodiments of the present disclosure.

FIG. 4 illustrates an elevation view of a mandrel assembly 310, according to some embodiments of the present disclosure. FIG. 5 is a cross-sectional view of the mandrel assembly 310 of FIG. 4, according to some embodiments of the present disclosure. In some embodiments, the die surface 320 formed by the die segments 321 has a smooth contoured profile to generate more frictional heat during a frictional stir process.

In the depicted example, the die segments 321 can collectively form a die surface 320 with a generally smooth, contoured profile to enable discontinuous contact with the billet 10. In some embodiments, portions of the die surface 320 can smoothly undulate or otherwise vary in an axial direction of the die stem 114. Advantageously, a smooth, contoured profile of the die surface 230 can generate increased frictional heat compared to a die surface with a flat or linear profile. Further, the smooth, contoured profile of the die surface 320 can avoid rapid cracking, deformation, or failure of the die assembly 310 compared to dies with fine details.

In some embodiments, the contoured profile of the die surface 320 can avoid chipping or wear between the interfaces of the die segments 321. As illustrated, the die surface 320 can include high slope portions 320a disposed away from the die segment 321 interfaces (near the center of a die segment 321) and low slope portions 320b disposed near die segment 321 interfaces (near the edges of the die segment 321). During operation, as the mandrel assembly 310 rotates (for example counterclockwise), the die surface 320 first makes contact with the billet with the high slope portions 320a of the die surface 320 and then the low slope portions 320b of the die surface 320 to avoid damage to the interfaces between the die segments 321.

As can be appreciated, the initial contact between the high slope portions 320a and billet creates frictional heat using rotational shear force and linear force applied by the mandrel assembly 310. During operation, the billet will initially be very hard and cold (i.e. room temperature) and will exhibit higher strength that could deform, chip, or wear the interfaces between the die segments 321. As the plasticized material heats up and starts to flow over the die surface 320, the material will flow toward the low slope portions 320*b* and across the interfaces between the die segments 321.

Subsequently, as the mandrel assembly 310 continues to rotate and the material then flows up the high slope portion 320*a* of the next die segment 321 and down the low slope portion 320*b* as the material transitions to the next die segment 321. Advantageously, the use of contoured die segments 321 prevents plasticized materials from flowing into crevices at the interface between die segments. Further, the use of contoured die segments 321 can prevent the cracking or chipping of die segments 321 compared to square cut die segments.

Optionally, portions of the die surface 320 can angle axially downward or inward such that billet 10 material flows along the interfaces between the die segments 321 without catching or filing material into the crevices between the die segments 321. Portions of the die surface 320 can be angled or tilted such that as the die assembly 310 rotates clockwise or counter-clockwise, allowing the billet material 10 to flow along the interfaces between the die segments 321.

In some embodiments, portions of the die surface 320 can have a generally concave profile, forcing billet 10 toward the extrusion cavity 316*a*. As illustrated, portions of the die surface 320 can be angled radially inward to direct billet 10 towards the center of the die assembly 310.

In some embodiments, the die assembly 310 can extrude tubes 20 with a varying outer diameter. As illustrated, the extrusion cavity 316*a* expands from a first diameter to a larger extrusion cavity 316*c* with a larger diameter. Optionally, the diameter of the extrusion cavity can transition in an intermediate extrusion cavity 316*b* disposed between the extrusion cavity 316*a* and the extrusion cavity 316*c*. During a frictional stir extrusion, the tubing 20 can expand to the diameter of the extrusion cavity 316*a*, 316*b*, 316*c*, as the billet 10 is processed and forced into the extrusion cavity 316*a*, 316*b*, 316*c*. In some embodiments, the die assembly 310 can be utilized with a tapered mandrel to provide tubing that varies in diameter and/or wall thickness.

Figure 6:
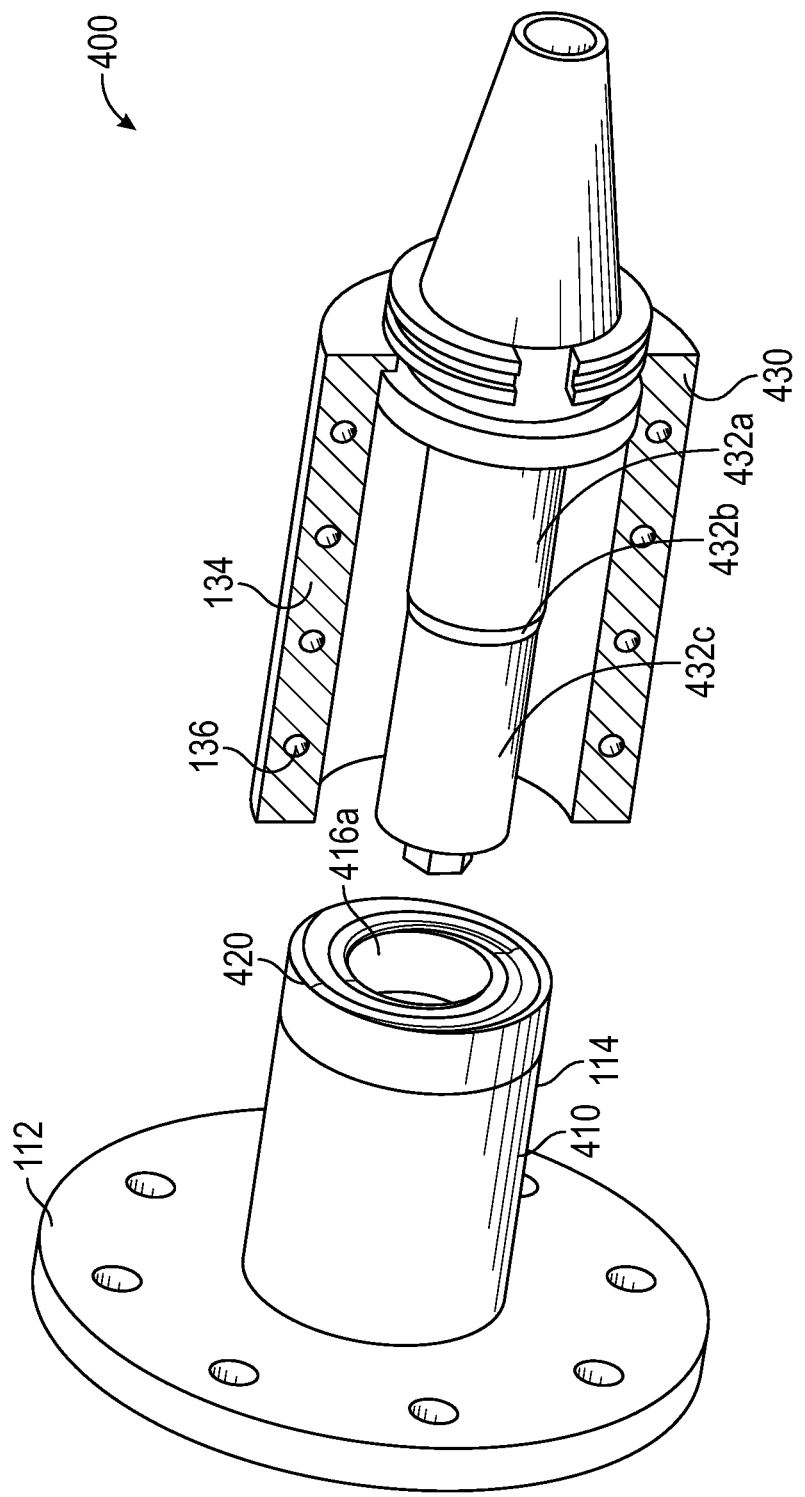
FIG. 6 illustrates a perspective view of a friction stir processing system, according to some embodiments of the present disclosure.
Figure 7:
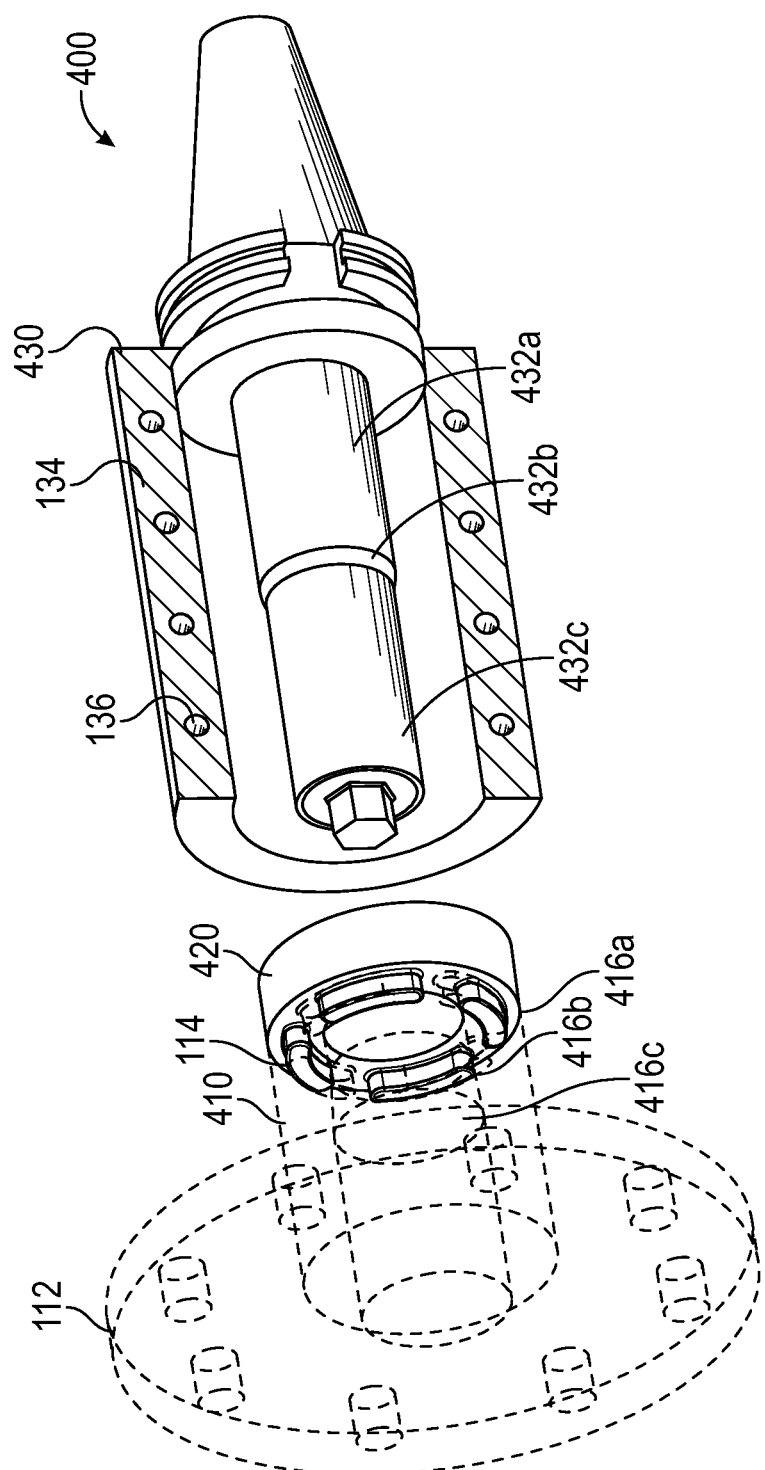
FIG. 7 illustrates a reverse perspective view of the friction stir processing system of FIG. 6, according to some embodiments of the present disclosure.

FIG. 6 illustrates a perspective view of a friction stir processing system 400, according to some embodiments of the present disclosure. FIG. 7 illustrates a reverse perspective view of the friction stir processing system 400 of FIG. 6, according to some embodiments of the present disclosure. In the depicted example, the die surface 420 is formed from a single piece of tungsten.

Optionally, the die surface 420 can have a drafted spiral scroll that rotates the same direction as the die assembly 410 during operation, drawing billet 10 toward the extrusion cavity 416*a*. In some embodiments, the scroll pattern is CNC-ground into die surface 420. The die surface 420 can have a conical face with blended surfaces to avoid sharp machined features that may deform more easily at high temperatures.

In some embodiments, the friction stir processing system 400 can extrude tubes 20 with a varying inner diameter. As illustrated, the inner mandrel 432*a* expands from a first diameter to a larger inner mandrel 432*c* with a larger diameter. Optionally, the diameter of the inner mandrel can transition in an intermediate inner mandrel 432*b* disposed between the inner mandrel 432*a* and the inner mandrel 432*c*. During a frictional stir extrusion, the inner diameter of the tubing 20 can taper to the inner diameter of the inner mandrel 432*a*, 432*b*, 432*c*, as the billet 10 is processed and forced into the inner mandrel 432*a*, 432*b*, 432*c*.

Similar to die assembly 310, the die assembly 410 can extrude tubes 20 with a varying outer diameter. As illustrated, the extrusion cavity 416*a* expands from a first diameter to a larger extrusion cavity 416*c* with a larger diameter. Optionally, the diameter of the extrusion cavity can transition in an intermediate extrusion cavity 416*b* disposed between the extrusion cavity 416*a* and the extrusion cavity 416*c*. During a frictional stir extrusion, the tubing 20 can expand to the diameter of the extrusion cavity 416*a*, 416*b*, 416*c*, as the billet 10 is processed and forced into the extrusion cavity 416*a*, 416*b*, 416*c*.

In some embodiments, the tapered mandrel assembly 430 can be utilized with the tapered die assembly 410 to provide tubing that varies in wall thickness and/or diameter. For example, the wall thickness and/or the diameter of the tube 20 can vary as the billet 10 is extruded between the varying inner diameter of the mandrel 432*a*, 432*b*, 432*c* and the varying outer diameter of the extrusion cavity 416*a*, 416*b*, 416*c*.

Figure 8:
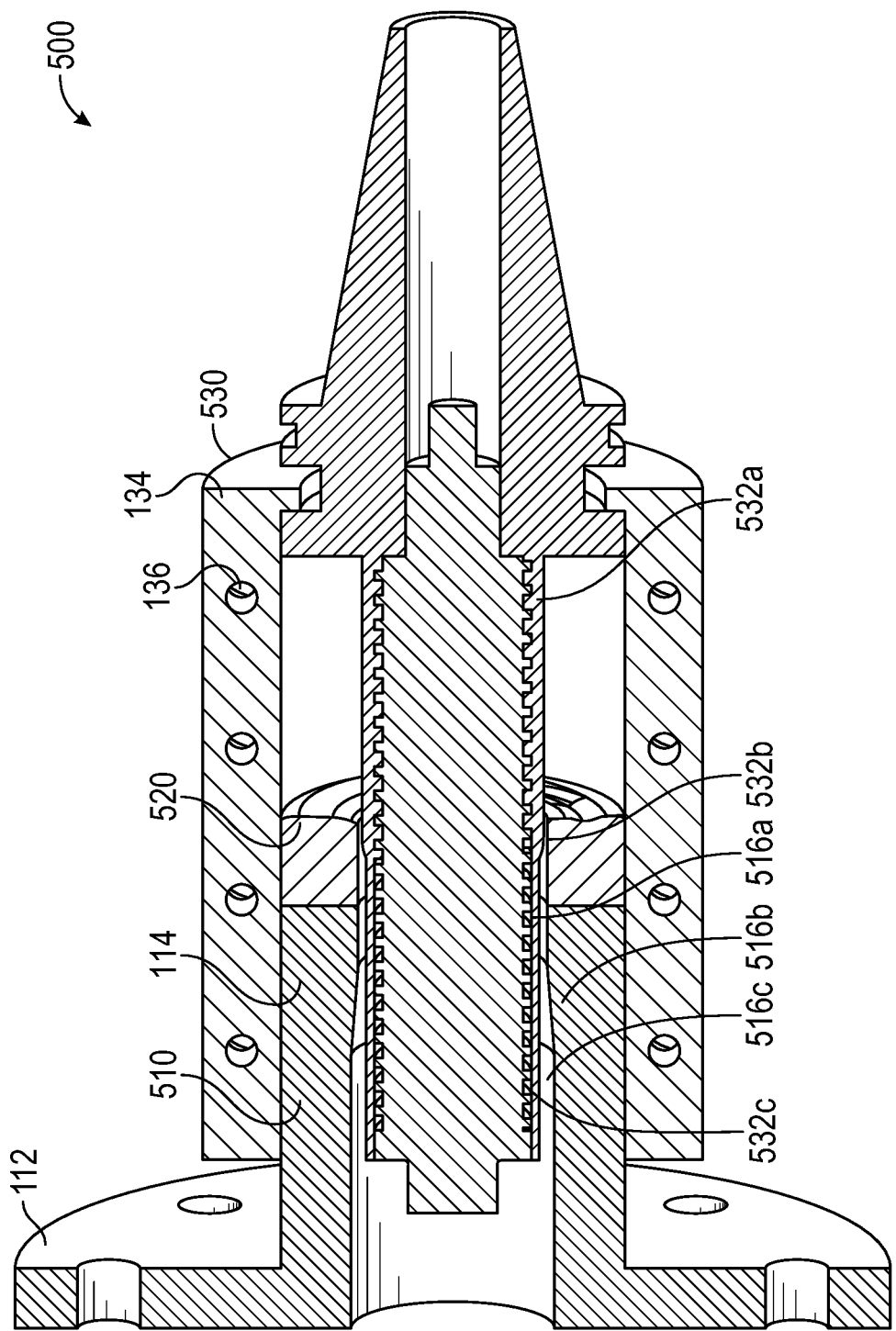
FIG. 8 illustrates a perspective view of a friction stir processing system, according to some embodiments of the present disclosure.

FIG. 8 illustrates a perspective view of a friction stir processing system 500, according to some embodiments of the present disclosure. Similar to friction stir processing system 400, the friction stir processing system 500 can provide for tubing with varying wall thicknesses, inner diameters, and/or outer diameters.

In some embodiments, the friction stir processing system 500 can extrude tubes 20 with a varying inner diameter. As illustrated, the inner mandrel 532*a* expands from a first diameter to a larger inner mandrel 532*c* with a larger diameter. Optionally, the diameter of the inner mandrel can transition in an intermediate inner mandrel 532*b* disposed between the inner mandrel 532*a* and the inner mandrel 532*c*. During a frictional stir extrusion, the inner diameter of the tubing 20 can taper to the inner diameter of the inner mandrel 532*a*, 532*b*, 532*c*, as the billet 10 is processed and forced into the inner mandrel 532*a*, 532*b*, 532*c*.

In some embodiments, the die assembly 510 can extrude tubes 20 with a varying outer diameter. As illustrated, the extrusion cavity 516*a* expands from a first diameter to a larger extrusion cavity 516*c* with a larger diameter. Optionally, the diameter of the extrusion cavity can transition in an intermediate extrusion cavity 516*b* disposed between the extrusion cavity 516*a* and the extrusion cavity 516*c*. During a frictional stir extrusion, the tubing 20 can expand to the diameter of the extrusion cavity 516*a*, 516*b*, 516*c*, as the billet 10 is processed and forced into the extrusion cavity 516*a*, 516*b*, 516*c*.

In some embodiments, the tapered mandrel assembly 530 can be utilized with the tapered die assembly 510 to provide tubing that varies in wall thickness and/or diameter. For example, the wall thickness and/or the diameter of the tube 20 can vary as the billet 10 is extruded between the varying inner diameter of the mandrel 532*a*, 532*b*, 532*c* and the varying outer diameter of the extrusion cavity 516*a*, 516*b*, 516*c*.

Figure 9:
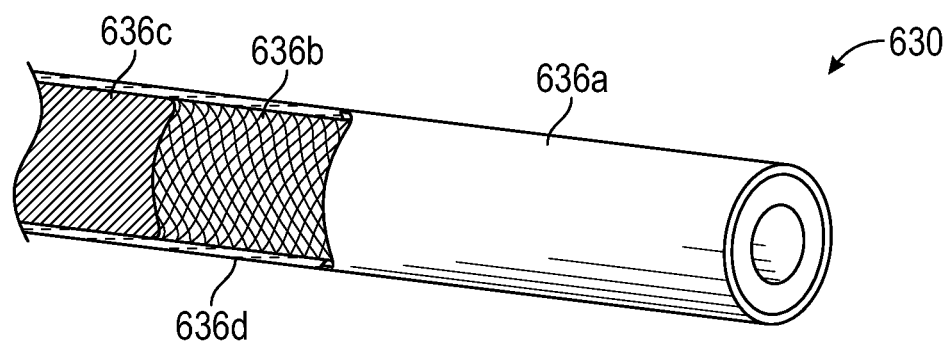
FIG. 9 illustrates an elevation view of a mandrel assembly, according to some embodiments of the present disclosure.
Figure 10:
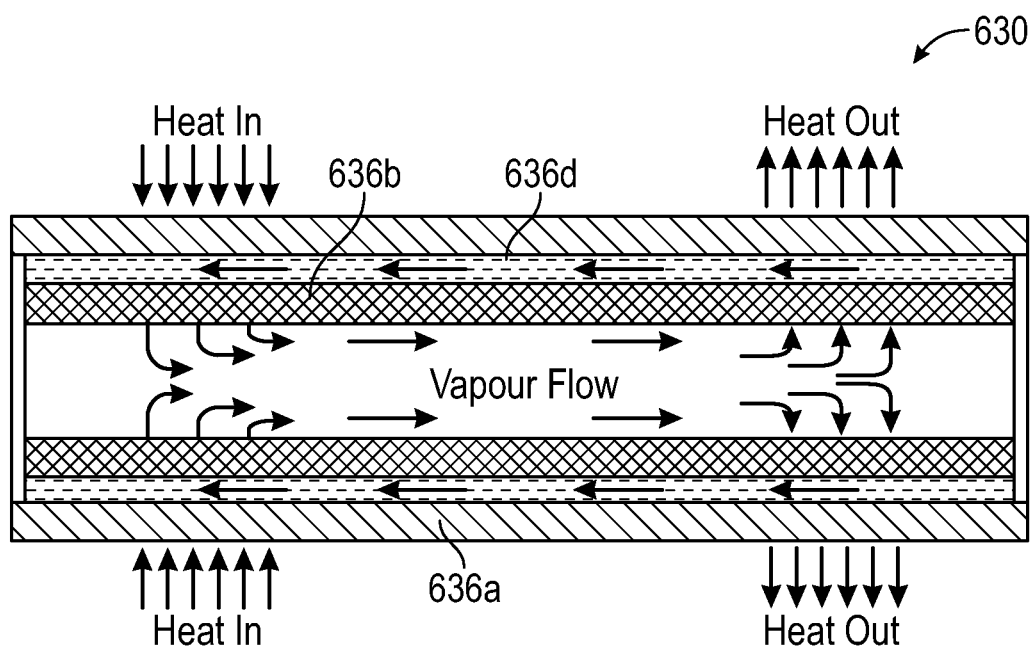
FIG. 10 is a cross-sectional view of the mandrel assembly of FIG. 9, according to some embodiments of the present disclosure.

FIG. 9 illustrates an elevation view of a mandrel assembly 630, according to some embodiments of the present disclosure. FIG. 10 is a cross-sectional view of the mandrel assembly 630 of FIG. 9, according to some embodiments of the present disclosure. In some embodiments, the mandrel assembly 630 can utilize a heat exchanger or heat pipe to remove heat from the friction stir processing system. In the depicted example, the mandrel assembly 630 allows for a working fluid to flow through channels 636d formed through the mandrel assembly 630 to transfer heat away from the billet 10 within the mandrel assembly 630. In some embodiments, the channels 636d can be integrally formed with the mandrel assembly 630. Optionally, the channels 636d are formed between a shell material 636a and a mesh 636b. Vapor flow 636c can be directed through the mandrel assembly 630 and interface with the working fluid. In some embodiments, the working fluid can be a fluid with a high heat transfer coefficient to remove heat from the friction stir processing system.

The heat exchanger can be a phase change heat exchanger that allows heat from friction stir processing to change a liquid working fluid entering channels 636d to change into a vapor and be condensed in a cooler portion of the heat exchanger. The channels 636d can be arranged as a loop heat pipe or pumped heat pipe where liquid is enters from one end and vapor leaves from the same end using the same pipe or channel. The heat exchanger can operate as a thermosyphon to allow for high heat transfer. Further, a thermosyphon can allow for heat exchanger arrangements where the vapor is condensed in a separate remote unit before returning a liquid to channels 636d. In some embodiments, the channel 636d can be located within the mandrel assembly 630 with a condenser located outside the mandrel assembly 630.

Optionally, the cooling rate of the exiting vapor can be adjusted to control the amount of heat removed from the mandrel assembly 630. In some embodiments, the rate of cooling the vapor is a parameter that can be adjusted by the friction stir processing system in response to the temperatures experienced during processing. Embedded thermocouples in the mandrel assembly 630 can provide temperature feedback to the friction stir processing controller and the controller can send a signal to the cooling unit to increase or decrease the rate of vapor cooling depending on the desired temperature. For example, when the friction stir processing is initiated and the materials are cold (e.g. room temperature) the controller can allow for more heat to remain within the mandrel assembly 630. As the material reaches a critical temperature to allow plasticization, the controller can maintain a desired temperature to prevent overheating, while maintaining plasticization.

In some embodiments, the mandrel assembly 630 includes graphite foam to transfer heat away from the mandrel assembly 630. Advantageously, graphite foam is temperature resistant and can uniformly cool and stabilize the friction stir processing system.

As can be appreciated, the cooling arrangement of the mandrel assembly 630 can allow for enhanced cooling during the processing of larger workpieces or tubing (in excess of 12 inches). Advantageously, by utilizing a phase change heat exchanger, the mandrel assembly 630 can provide improved cooling over systems that utilize liquid cooling. Conventional "once through" liquid cooling may not regulate temperatures as described herein. Further, the use of phase change heat exchangers can avoid the use of more complex or costly cooling solutions, such as nitrogen cooling. In some embodiments, nitrogen cooling can supplement the cooling of the mandrel assembly 630.

Figure 11:
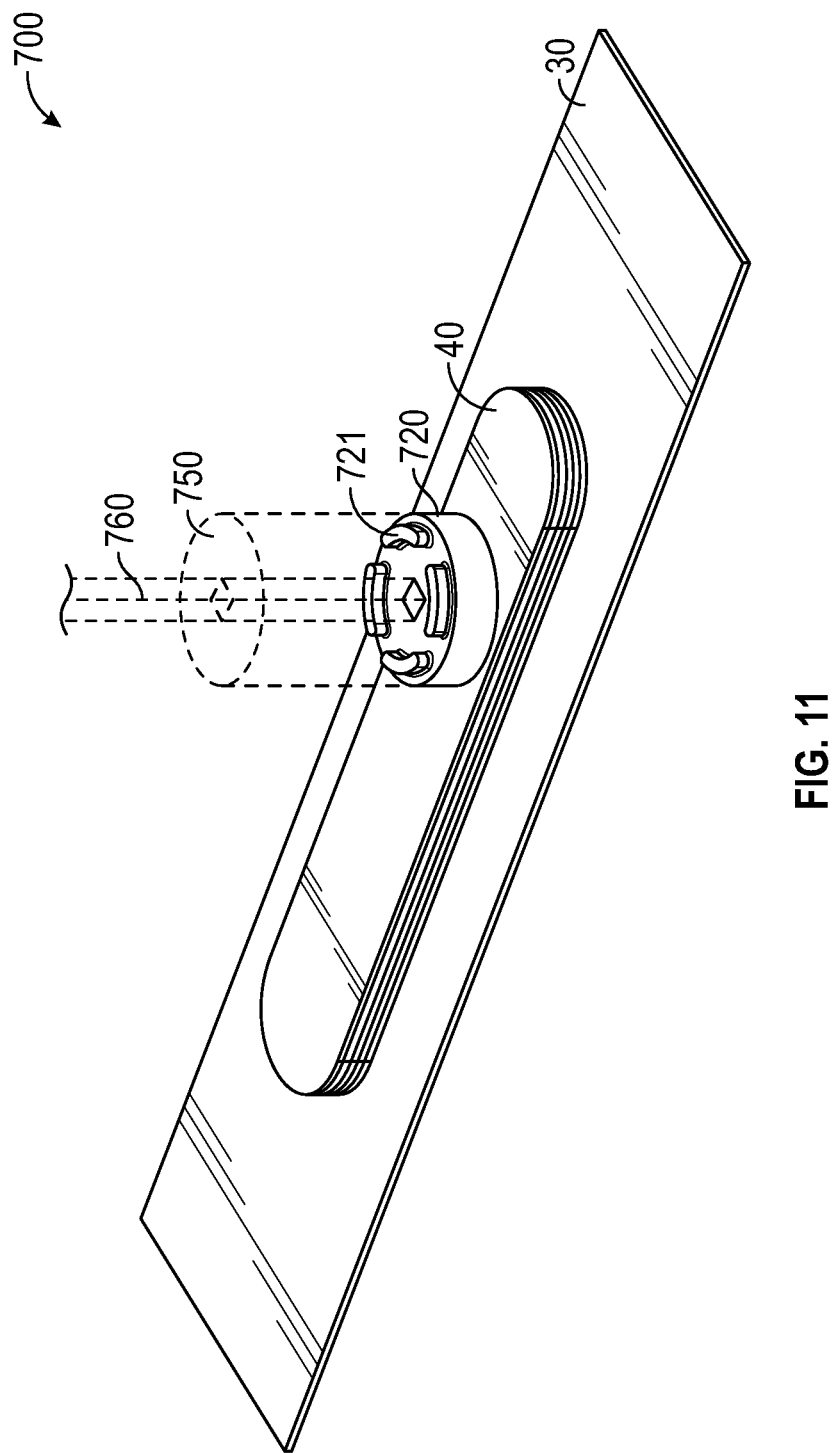
FIG. 11 illustrates a perspective view of a friction stir processing system, according to some embodiments of the present disclosure.

FIG. 11 illustrates a perspective view of a friction stir processing system 700, according to some embodiments of the present disclosure. In the depicted example, the friction stir processing system 700 can form structures utilizing friction stir processing.

In the depicted example, the friction stir processing system 700 utilizes a type of friction stir processing referred to as additive friction stir deposition (AFS-D) whereby a rod 760 is forced through a rotating tool 750 to deposit a structure 40 on a substrate 30. Advantageously, the structure 40 can have a fine grain microstructure.

In some embodiments, a feedstock rod 760 is advanced toward a rotating tool 750 or the substrate 30 during the AFS-D process. The feedstock rod 760 can be formed from high temperature alloys such as titanium and/or Inconel.

In the depicted example, the rotating tool 750 is rotated either directly or indirectly by a motor and/or pulley assembly. Optionally, the rotating tool 750 can be rotated by the feedstock rod 760 or a tool shaft. In some embodiments, the tool shaft can include set screws to retain the rotating tool 750. In some applications, the rotating tool 750 can be removed from the tool shaft for servicing.

During the AFS-D process, the feedstock rod 760 is advanced or otherwise presented to the die surface 720, imparting frictional heating to the feedstock rod 760 at the die surface 720. As can be appreciated, the frictional heating of the feedstock rod 760 and the axial force imparted by the rotating tool 750 can result in plastic deformation of the feedstock rod 760. Further, as a result of the extreme conditions of the FSE process, severe deformation and wear can occur at the die surface 720.

Advantageously, the die surface 720 can be formed from a plurality of die segments 721. In the depicted example, the die segments 721 can be formed from tungsten to withstand high temperatures required for processing high temperature metals such as titanium and/or Inconel. In some embodiments, other portions of the rotating tool 750 can be formed from superalloys (nickel-cobalt alloy, such as MP159 or a tungsten alloy), maraging steels, and/or tool steels.

As the feedstock rod 760 is frictionally heated, the feedstock rod 760 can be deposited on the substrate 30 to form structure 40. As can be appreciated, the structure 40 can be deposited by the frictional heating process, additively forming a desired structure 40 without melting the feedstock rod 760.

Terms such as "top," "bottom," "front," "rear", "above", and "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A friction stir processing system, comprising:
   a rotatable die assembly comprising:
   a die body defining a die base and a die stem, wherein the die stem extends axially from the die base, the die stem defines an extrusion cavity;
   multi-piece die segments individually coupled to the die stem; and
   a mandrel assembly, wherein the multi-piece die segments are disposed around the extrusion cavity to collectively form i) a die surface opposite to the die base and ii) an opening configured to receive the mandrel assembly.

2. The friction stir processing system of claim 1, wherein each of the multi-piece die segments comprises a die segment boss configured to engage with a respective mating receptacle of the die stem.

3. The friction stir processing system of claim 1, wherein the die surface formed by the multi-piece die segments defines a smooth contoured profile comprising a high slope portion and a low slope portion.

4. The friction stir processing system of claim 3, wherein the die surface formed by the multi-piece die segments defines a sloping profile.

5. The friction stir processing system of claim 1, wherein the die surface formed by the multi-piece die segments defines a concave profile, and the concave profile is directed toward the extrusion cavity.

6. The friction stir processing system of claim 1, wherein the extrusion cavity tapers from a first diameter to a second diameter.

7. The friction stir processing system of claim 1, wherein the die body is formed from a first material and the multi-piece die segments are formed from a second material different from the first material comprises a nickel-cobalt alloy or a tungsten alloy.

8. The friction stir processing system of claim 7, wherein the first material comprises a nickel-cobalt alloy or a tungsten alloy, and the second material comprises tungsten.

9. The friction stir processing system of claim 1, wherein the mandrel assembly comprises:
   an inner mandrel axially aligned with the extrusion cavity and configured to enter the opening; and
   an outer mandrel disposed around the inner mandrel and configured to pass around the multi-piece die segments, wherein the inner mandrel and the outer mandrel define a container volume.

10. The friction stir processing system of claim 9, wherein the inner mandrel tapers from a first diameter to a second diameter.

11. The friction stir processing system of claim 9, wherein the outer mandrel defines a cooling channel around the container volume.

12. The friction stir processing system of claim 9, wherein the outer mandrel defines a phase change heat exchanger around the container volume.

13. The friction stir processing system of claim 9, wherein the mandrel assembly is formed from a nickel-cobalt alloy or a tungsten alloy.

14. A friction stir processing system, comprising:
   a rotatable die assembly comprising:
   a die body defining a die base and a die stem, wherein the die stem extends axially from the die base, the die stem defines an extrusion cavity, and the die body is formed from a first material; and
   a die surface portion coupled to the die stem, wherein the die surface portion defines a conical face having a spiral scroll feature, the die surface portion is disposed around the extrusion cavity, the die surface portion is formed from a second material, and the second material is different than the first material.

15. The friction stir processing system of claim 14, wherein the spiral scroll feature is ground into the die surface portion.

16. A method comprising:
   rotating a die surface of a die assembly against a billet, wherein the die assembly comprises a multi-piece die segments individually coupled to a die stem, the multi-piece die segments collectively form i) the die surface and ii) an opening;
   receiving a mandrel assembly through the opening; and
   plasticizing the billet into a product.

17. The method of claim 16, further comprising:
   advancing the billet toward the die surface via the mandrel assembly.

18. The method of claim 16, wherein plasticizing the billet comprises forming is an extruded tube.

19. The method of claim 16, further comprising depositing the billet on to a substrate.

20. The friction stir processing system of claim 1, wherein the multi-piece die segments comprise separable die segments.

* * * * *